(12) United States Patent
Stephany et al.

(10) Patent No.: US 6,993,162 B2
(45) Date of Patent: Jan. 31, 2006

(54) METHOD FOR AUTHENTICATING ANIMATION

(75) Inventors: Thomas M. Stephany, Churchville, NY (US); Majid Rabbani, Pittsford, NY (US); John R. Squilla, Rochester, NY (US); Donald E. Olson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 829 days.

(21) Appl. No.: 09/882,195

(22) Filed: Jun. 15, 2001

(65) Prior Publication Data

US 2003/0005296 A1   Jan. 2, 2003

(51) Int. Cl.
*G06K 9/00*   (2006.01)

(52) U.S. Cl. ..................... 382/118; 380/201

(58) Field of Classification Search .............. 382/100, 382/118; 380/28, 54, 201; 713/200, 201
See application file for complete search history.

(56) References Cited

U.S. PATENT DOCUMENTS

| | | | |
|---|---|---|---|
| 6,047,078 A * | 4/2000 | Kang ........................ | 382/107 |
| 6,128,398 A * | 10/2000 | Kuperstein et al. ......... | 382/118 |
| 6,731,287 B1 * | 5/2004 | Erdem ....................... | 345/473 |
| 6,744,914 B1 * | 6/2004 | Rubbert et al. ............ | 382/154 |
| 6,788,800 B1 * | 9/2004 | Carr et al. .................. | 382/100 |
| 2002/0176610 A1 * | 11/2002 | Okazaki et al. ............ | 382/118 |

FOREIGN PATENT DOCUMENTS

WO   WO 99/13415   3/1999

OTHER PUBLICATIONS

M. P. Queluz, "Authentication of digital images and video: Generic models and a new contribution," *Signal Processing: Image Communication*, Elsevier Science Publishers, Amsterdam, NL, vol. 16, No. 5, Jan. 2001, pp. 461-475.

R. Ohbuchi, et al., "Data embedding algorithms for geometrical and non-geometrical targets in three-dimensional polygonal models," *Computer Communications*, Elsevier Science Publishers, Amsterdam, NL, vol. 21, No. 15, Oct. 1, 1998, pp. 1344-1354.

F. Lavagetto, et al., "The facial animation engine: Toward a high-level interface for the design of MPEG-4 compliant animated faces," *IEEE Transactions On Circuits And Systems For Video Technology*, IEEE Inc., New York, US, vol. 9, No. 2, Mar. 1999, pp. 277-289.

* cited by examiner

*Primary Examiner*—Gregory Morse
*Assistant Examiner*—Ellen C Tran
(74) *Attorney, Agent, or Firm*—Peyton C. Watkins

(57) ABSTRACT

A method for authenticating animation, the method comprises the steps of capturing an image; converting the captured image into a wire mesh data for permitting animation of the image; providing movement data, which directs movement of the wire mesh data, and texture data indicating the covering for the wire mesh; electronically transmitting the wire mesh data, texture data and movement data; encrypting the movement data; and electronically transmitting the encryption the movement data for verifying that the animation is unaltered during transmission from its source.

16 Claims, 3 Drawing Sheets

METHOD FOR AUTHENTICATING ANIMATION

FIELD OF THE INVENTION

The present invention relates to producing and transmitting animation and, more particularly, to encrypting such animation before transmission for producing a secure animation that is essentially tamper-proof during transmission.

BACKGROUND OF THE INVENTION

Animation typically includes a three-dimensional wire mesh produced from an image and a texture model that represents the visual features associated with the wire mesh. A set of movement instructions is produced for directing movement of the wire mesh. When the instructions are input to the wire mesh having the texture model residing thereon, a three-dimensional moving image is produced.

Typically, the wire mesh, texture model and instructions are sent to a customer for their entertainment and/or use. Although the presently known and utilized animation creation and transmission components are satisfactory, they include drawbacks. During transmission, such components may be intercepted and undesirably modified.

Consequently, a need exists for a secure method for transmitting such animation that is essentially tamper-proof.

SUMMARY OF THE INVENTION

The present invention is directed to overcoming one or more of the problems set forth above. Briefly summarized, according to one aspect of the present invention, the invention resides in a method for authenticating animation, the method comprising the steps of (a) capturing an image; (b) converting the captured image into a wire mesh data for permitting animation of the image; (c) providing movement data, which directs movement of the wire mesh data, and texture data indicating the covering for the wire mesh; (d) electronically transmitting the wire mesh data, texture data and movement data; (e) encrypting the movement data; and (f) electronically transmitting the encryption the movement data for verifying that the animation is unaltered during transmission from its source.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the advantage of electronically transmitting animation that is essentially tamper-proof.

The present invention includes the feature of encrypting the animation before transmission for insuring verification that the animation is unaltered.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a portion of the present invention will be described in the preferred embodiment as a software program. Those skilled in the art will readily recognize that the equivalent of such software may also be constructed in hardware.

Figure 1:
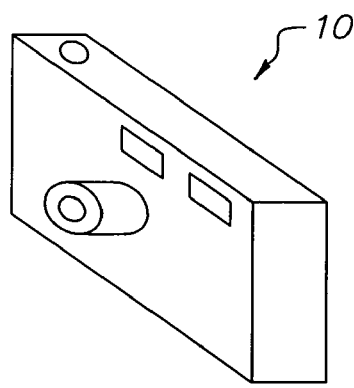
FIG. 1 is a perspective view of a digital camera of the present invention.

Referring to FIG. 1, there is shown a digital camera 10 for capturing digital images. The digital camera 10 includes an image sensor (not shown) for capturing the incident light and converted it into electronic signals. Such digital cameras 10 are well known in the art and will not be discussed further detail herein. Similarly, it should be understood by those skilled in the art that the camera 10 could also be a film based camera whose images are digitized for animation after processing of the film.

Figure 4:
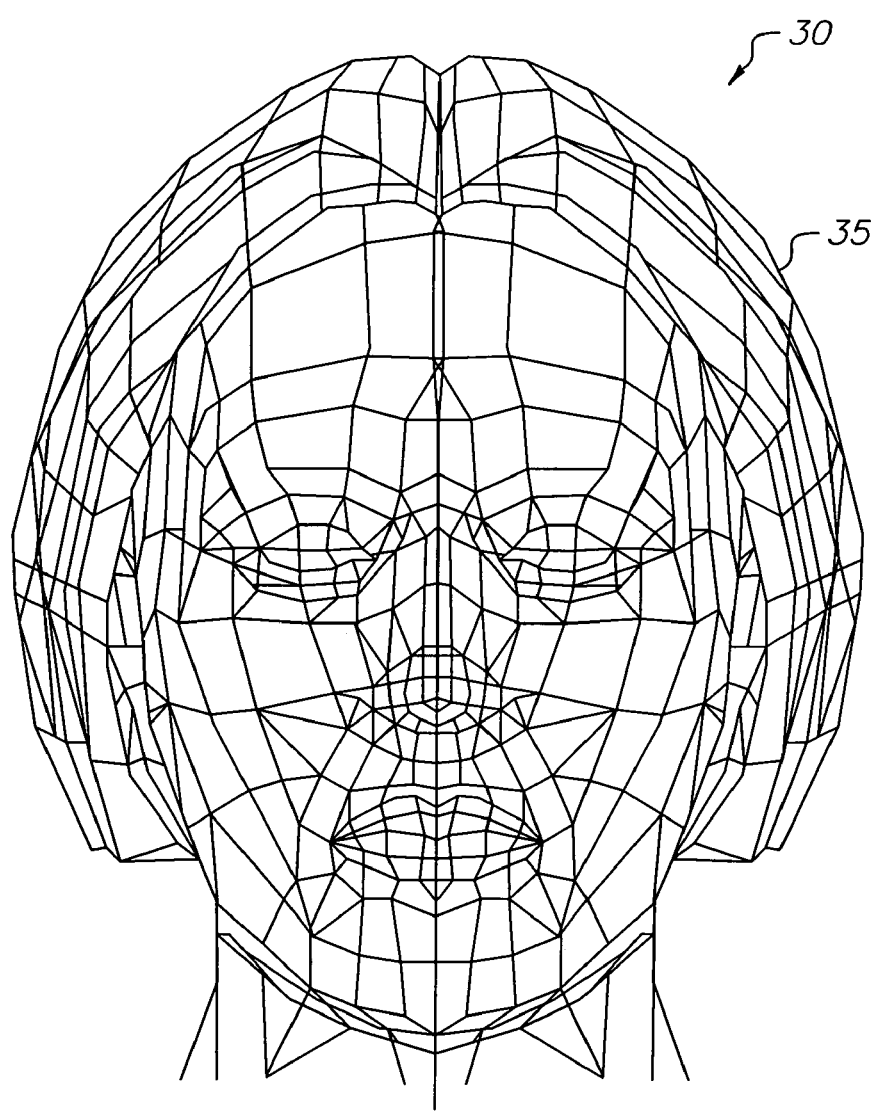
FIG. 4 is a perspective view of a typical wire mesh.
Figure 2:
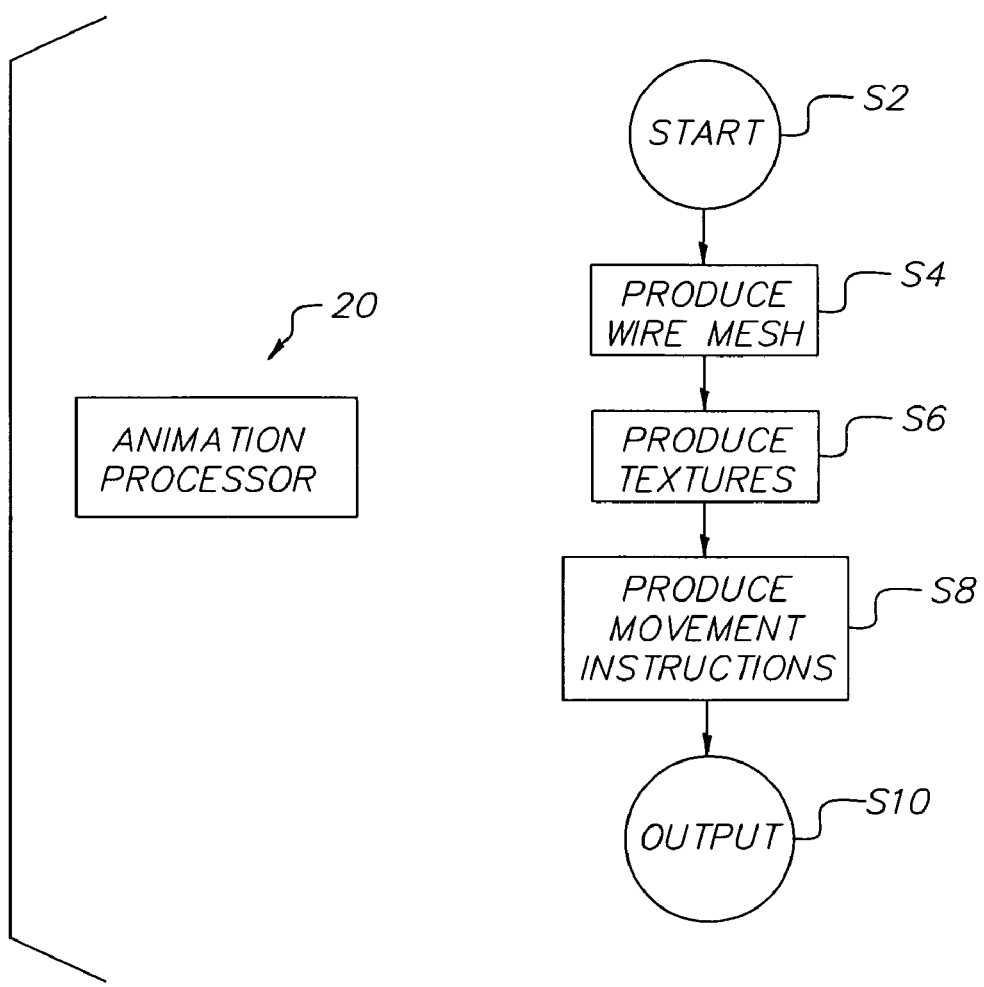
FIG. 2 is a diagram of an animation processor, a corresponding flow chart illustrating creation of a typical animation from the processor and a corresponding wire mesh produced from the processor.

Referring to FIG. 2, there is shown an animation processor 20 and a flow chart for producing the animation. As is well known to those skilled in the art, the animation processor 20 includes electronic components therein for producing wire mesh, texture (or skinning) information and movement instructions for the animation. In this regard, the animation process is initiated S2, and the processor 20 produces S4 a three-dimensional wire mesh 30 from the digital image input by the user. Referring briefly to FIG. 4, the wire mesh 30 is a plurality of interconnecting segments 35 that forms a model of the exterior shape of the input image. Referring back to FIG. 2, the processor 20 further analyzes the input image, and produces S6 a texture model for each image for producing a digital representation of the exterior, visible features of the image. The user will instruct the animation processor 20 as to the particular movements desired for the image. From these instructions, the animation processor 20 produces S8 movement data that directs the individual segments of the wire mesh to deform thus producing movement. The animation processor 20 outputs S10 the wire mesh, texture and corresponding movement instructions to the user in a file structure. This process may be repeated for a subsequent image or simply produce different movement instructions for an existing wire frame.

Figure 3:
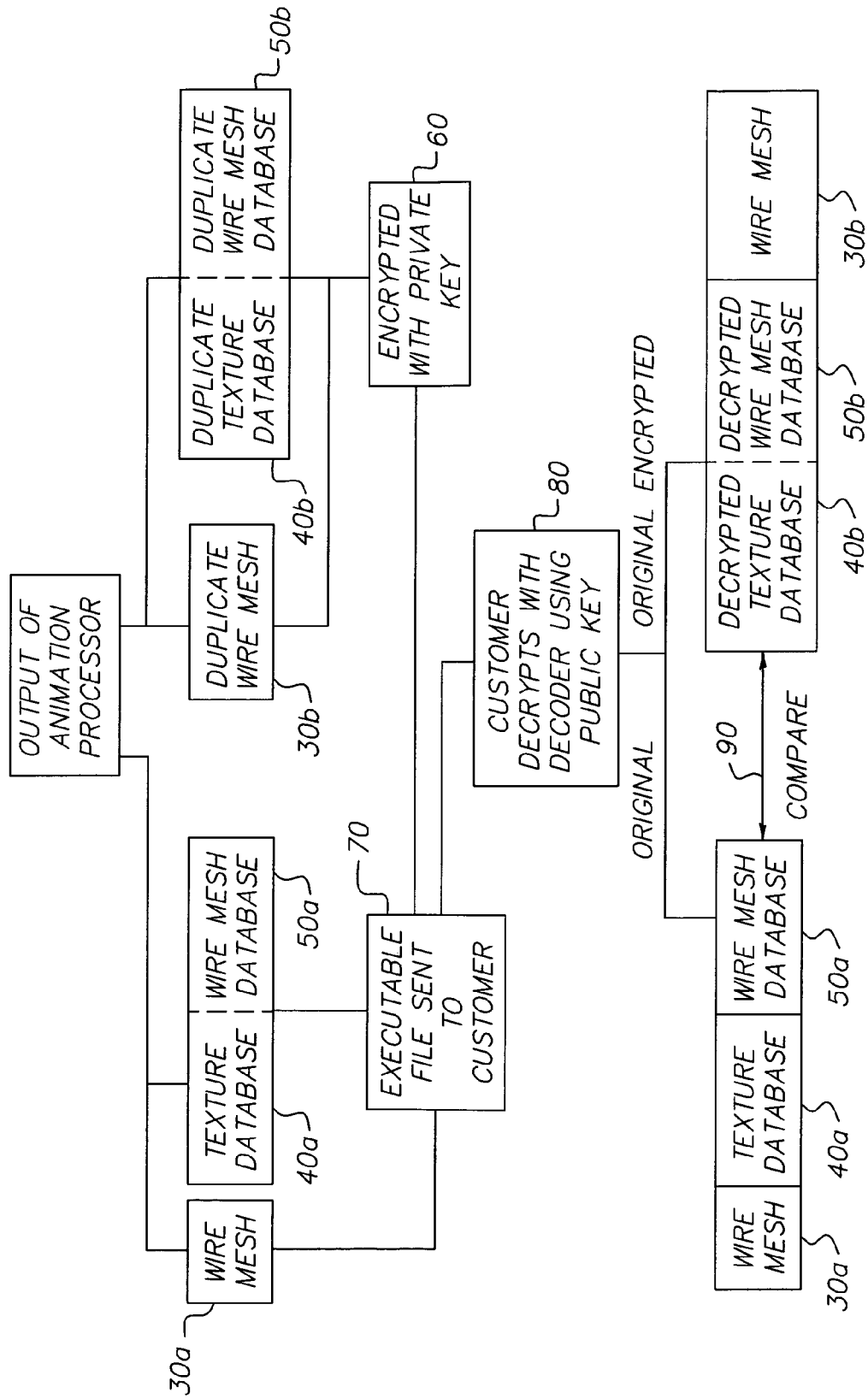
FIG. 3 is a process flowchart illustrating the method of the present invention for securely transmitting an animation.

Referring to FIG. 3, there is shown a flow diagram of the present invention for sending the wire mesh 30a, texture database 40a, and movement instructions (wire mesh database) 50a to a user which ensures all of these components have not been modified or altered during transmission. In this regard, the wire mesh 30a, textured database 40a and movement instructions 50a produced by the animation processor is sent to a user, such as via the Internet or manual distribution and the like. The sender then encrypts the texture database 40b, wire mesh 30b and wire mesh database 50b with a private key 60 for producing a secure executable file 70 which is essentially tamper proof. The sender may send this encryption via any suitable means, such as via the Internet or manual distribution and the like, or it may be send as an attachment to the unencrypted file.

The receiver of the digital files then decrypts 80 the texture database 40b, wire mesh 30b and wire database 50b with a public key. The public key may be sent to the user by the sender, or may be retrieved from publicly accessible facilities, such as the Internet and the like. As well known to those skilled in the art, the public key may only decrypt the digital files, whereas the private key can encrypt and decrypt. Such encryption and decryption technology is well known in the art and will not be discussed in detail herein. The customer then compares 90 the decrypted texture 40b, wire mesh 30b and wire database 50b with the originally received texture database 40a, wire mesh 30a and wire database 50a. This comparison may be performed by any suitable computer having code for performing such task, which code requires minimal computer skills to prepare and, as a result, will not be discussed in detail herein.

If the decrypted texture 40b, wire mesh 30b and wire database 50b is the same as the originally sent texture database 40a, wire mesh 30a and wire database 50a, the animation is verified as being unmodified during transmission. If they are not the same, the originally sent animation has been modified without proper authority.

In an alternative embodiment, in lieu of encrypting the duplicate wire mesh 30b, duplicate texture database 40b and duplicate wire mesh database (collectively referred to as duplicates), each or any one of these could be "hashed" and then encrypted before sending to the customer. In this regard, hashing includes passing all or each of the desired duplicates through an algorithm for converting it into a unique smaller representation, which is well known in the art. One example of a hashing algorithm is the SHA-1 algorithm as specified in FIPS PUB 180-1, which hashes any given size data to only 20 bytes. This hash is then encrypted and sent to the customer where the hash is decrypted.

The customer then passes the corresponding original (either or all of the wire mesh 30a, texture database 40a and wire mesh 50a) through the same hashing algorithm for obtaining a corresponding smaller unique representation. As is well known in the art, any alteration of the data that is subsequently hashed with a cryptographically strong hashing function is likely to result in a different hash from a hash of the unaltered data, which obviously indicates that the data has been altered. The user or customer then compares the two hashes for verifying whether the data has been altered.

The invention has been described in detail with particular reference to certain preferred embodiments thereof, but it will be understood that variations and modifications can be effected within the spirit and scope of the invention.

PARTS LIST 10 digital camera
20 animation processor
30 wire mesh
35 interconnecting segments
30a wire mesh
30b wire mesh
40a texture database
40b texture database
50a movement instructions (wire mesh database)
50b movement instructions (wire mesh database)
60 private key
70 executable file
80 customer decrypts
90 customer compares -continued

PARTS LIST

S2 process initiated
S4 produce wire mesh
S6 produce textures
S8 produce movement instructions
S10 output

What is claimed is:

1. A method for authenticating animation, the method comprising the steps of:
    (a) converting a captured image into three-dimensional wire mesh data representing a three-dimensional exterior shape of the image having a plurality of line segments for permitting animation of the image;
    (b) providing movement data, which directs movement of the wire mesh data, and texture data indicating the covering for the wire mesh;
    (c) electronically transmitting the three-dimensional wire mesh data, texture data and movement data;
    (d) encrypting the movement data; and
    (e) electronically transmitting the encrypted movement data for verifying that the animation is unaltered during transmission from its source.

2. The method as in claim 1 further comprising the step of encrypting the texture data before electronically transmitting.

3. The method as in claim 2 further comprising the step of encrypting the wire mesh data before electronically transmitting.

4. The method as in claim 3, wherein step (e) includes transmitting via the Internet.

5. The method as in claim 4, wherein step (a) includes converting the captured image by an animation processor.

6. The method as in claim 5, wherein step (c) includes transmitting via the Internet.

7. The method as in claim 3, wherein step (c) includes manually distributing in lieu of electronically distributing.

8. The method as in claim 7, wherein step (e) includes manually distributing in lieu of electronically distributing.

9. A method for authenticating animation, the method comprising the steps of:
    (a) converting a captured image into three-dimensional wire mesh data representing a three-dimensional exterior shape of the image having a plurality of interconnecting segments for permitting animation of the image;
    (b) providing movement data, which directs movement of the three-dimensional wire mesh data, and texture data indicating the covering for the wire mesh;
    (c) electronically transmitting the wire mesh data, texture data and movement data;
    (d) encrypting a representation of the movement data which representation includes less bits of data than the movement data; and
    (e) electronically transmitting the encrypted representation of the movement data for verifying that the animation is unaltered during transmission from its source.

10. The method as in claim 9, further comprising the step of encrypting a representation of the texture data before electronically transmitting, which representation includes less bits of data than the texture data.

11. The method as in claim 10, further comprising the step of encrypting a representation of the wire mesh data before electronically transmitting, which representation includes less bits of data than the wire mesh data.

12. The method as in claim 10, wherein step (e) includes transmitting via the Internet.

13. The method as in claim 12, wherein step (a) includes converting the captured image by an animation processor.

14. The method as in claim 13, wherein step (c) includes transmitting via the Internet.

15. The method as in claim 11, wherein step (c) includes manually distributing in lieu of electronically distributing.

16. The method as in claim 15, wherein step (e) includes manually distributing in lieu of electronically distributing.

* * * * *